(12) United States Patent
Long

(10) Patent No.: US 7,674,747 B1
(45) Date of Patent: Mar. 9, 2010

(54) APPEARANCE CHANGING DECORATIONS ON FABRIC USING DISAPPEARING INK

(75) Inventor: Edward Lawrence Long, Glen Mills, PA (US)

(73) Assignee: Edward L. Long, Glen Mills, PA (US)

( * ) Notice: Subject to any disclaimer, the term of this patent is extended or adjusted under 35 U.S.C. 154(b) by 728 days.

(21) Appl. No.: 11/486,325

(22) Filed: Jul. 13, 2006

Related U.S. Application Data

(60) Provisional application No. 60/699,484, filed on Jul. 15, 2005.

(51) Int. Cl.
*B41M 5/35* (2006.01)
(52) U.S. Cl. ........................... 503/201; 503/204
(58) Field of Classification Search ............ None
See application file for complete search history.

(56) References Cited

U.S. PATENT DOCUMENTS 5,490,956 A * 2/1996 Kito et al. ............ 252/583
6,604,854 B1 8/2003 Limburg

* cited by examiner

*Primary Examiner*—Bruce H Hess

(57) ABSTRACT

A process to produce novelty fabric decorations comprising of thermochromic (heat-activated) disappearing fabric ink, that is screen printed onto a fabric in predetermined patterns, whereby allowing a fabric decoration to perform a dramatic transformation or allowing a hidden image or a hidden message printed with standard fabric inks to remain concealed, until such time that the thermochromic disappearing ink begins a transition to transparent, causing the decoration to dramatically transform or reveal the hidden graphic or the hidden message resulting in an interactive, ever-changing article of clothing.

2 Claims, 7 Drawing Sheets

Happy Birthday Jennifer

FIG. 9

Happy Birthday

FIG. 10

Jennifer

FIG. 11

APPEARANCE CHANGING DECORATIONS ON FABRIC USING DISAPPEARING INK

CROSS-REFERENCE TO RELATED APPLICATIONS

This application claims the benefit of PPA Ser. No. 60/699,484 filed 2005 Jul. 15 by the present inventor.

FEDERALLY SPONSORED RESEARCH

Not Applicable

SEQUENCE LISTING

Not Applicable

BACKGROUND OF THE INVENTION

1. Field of Invention

This invention relates to fabric decoration, specifically screen printing onto fabric or clothing for novelty and decorative purposes.

2. Discussion of Prior Art

Thermochromic pigments were invented in 1970 by Dr Suzuki of Kirokusozai Sogo Kenkyusho Co. Thermochromic pigments have been commercially available in the United States for fabric decoration since the early 1990's. The commercially available thermochromic inks for fabric decoration have not become main-stream because they are expensive, they lack opacity and there is very little information readily available regarding their use.

U.S. Pat. No. 5,490,956 to Kito (1996) suggests concealing an object within a three dimensional plastic object composed of a clear plastic resin and thermochromic pigments. This process would work for a variety of decorative three dimensional objects such as a paper weight, but this process would not work well for clothing, because the heavy weight of the plastic needed to conceal an image on an article of clothing would result in the fabric sagging and constant stress on the fabric where the plastic was located, resulting in a deformed article of clothing and an uncomfortable fit for the person wearing the garment. Additionally, there could be laundering problems and manufacturing limitations. To yield acceptable results on clothing, a masking effect with a thin ink deposit is needed.

U.S. Pat. No. 6,604,854 to Limburg (2003) discloses a means for creating thermometers on plastic substrate films, decals and refrigerator magnets with sensors that appear and disappear from respective concealing features according to temperature. The first step in the process is to choose a standard ink that is appropriate for the intended plastic substrate. The standard ink is used later to print a hidden text message. Next, a thermochromic disappearing ink suitable for the intended plastic substrate is mixed in its non-activated/cold state so that it very closely or exactly matches the color of the standard non-disappearing ink previously chosen for the hidden text message. The hidden text message such as "Too Hot" is printed on the plastic substrate with the standard non-disappearing ink. The thermochromic disappearing ink is then printed around the hidden message. Because both inks match in color, it appears as though the two images printed are one continuous solid object. This camouflages the hidden text message. The described process would work well for use as a plastic sheet thermometer but if used for clothing decoration would suffer from a number of limitations and disadvantages:

(a) The inks described are intended for use on plastic film not fabric.

(b) The field of the invention is for temperature sensing devices (thermometers) that exhibit an interesting or graphic means to reveal or inform an individual of a temperature or temperature range with messages such as, "Too Hot", "Warm", and "Just Right". My invention is not designed or intended to educate or inform temperature information, but rather to create interactive novelty clothing decorations that perform dramatic reversible metamorphic changes throughout the day for the person wearing the article of clothing.

(c) A minor change in temperature will alter the color of the thermochromic ink, resulting in two ink colors that would no longer match, thus revealing the image that you are trying to conceal too quickly. For novelty clothing, best results are achieved when a combination of concealment is used involving a thermochromic ink with a similar color value to the hidden image ink, which is screen printed around the hidden image followed by screen printing detailed line work composed of a dark thermochromic disappearing ink on top. "Color value" is defined as the relative lightness or darkness of a color. An exact color match or very similar color match is not needed with my invention if detailed line work consisting of a dark colored thermochromic ink is also printed over the image to be concealed.

(d) The process as described can only be printed on light colored or clear substrates. Thermochromic pigments are transparent in nature, and are virtually invisible when printed on dark substrates.

(e) Thermochromic pigments tend to degrade over time with prolonged exposure to Ultra-Violet (UV) light which results in an ink that does not return to the colorized state when cooled and eventually remains transparent at all times, regardless of temperature. Therefore, the applications described by U.S. Pat. No. 6,604,854 would result in short life expectancy of the temperature sensing devices when used outdoors, rendering them nonfunctional for the intended purpose. When screen printing for novelty purposes on clothing, should the thermochromic pigments fail to operate as designed, which would result in the thermochromic ink remaining invisible despite environmental temperature, the garment would still contain the interesting hidden image and could still be worn, which is clothing's primary function.

3. Objects and Advantages

Accordingly, several objects and advantages of my invention are:

(a) To provide a novelty garment that interacts with an individual wearing the garment;

(b) To provide a novelty garment that performs dramatic transformations depending on the environmental temperature;

(c) To provide a means to incorporate a hidden graphic or message into a variety of screen printed fabric designs, which become revealed when a predetermined temperature is reached;

(d) To provide textile screen printers a thermochromic disappearing ink that is easy to work with and yields a very dark color value on light colored fabrics;

(e) To provide a means to produce decorations with hidden messages or hidden graphics or that perform transformations on dark colored fabric;

(f) To provide a means to decorate clothing with thermochromic ink, in which an appearance of a printed decoration changes and in which the appearance change is reversible depending on environmental temperature;

(g) To provide an article of novelty clothing that will maintain an appealing decoration and that will remain wearable in the event that the thermochromic pigmentation used to decorate the article of novelty clothing should fail to operate as intended due to prolonged exposure to UV light;

Further objects and advantages of my invention will become apparent from a consideration of the drawings and ensuing description

SUMMARY

A novelty fabric decorating process comprising of at least one thermochromic (heat-activated) disappearing fabric ink, that is screen printed onto a fabric in predetermined patterns, whereby allowing a fabric decoration to perform a dramatic transformation or allowing a hidden graphic or a hidden message printed with standard fabric inks to remain concealed, until such time that the thermochromic disappearing ink begins a transition to transparent, revealing the hidden graphic or the hidden message. The ability of the thermochromic ink to become transparent is reversible, hence as environmental temperatures drop below the transition temperature, the thermochromic ink will begin to re-colorize, thus reversing the dramatic transformation or concealing the hidden graphic or concealing the hidden message resulting in an interactive, ever-changing article of clothing.

BRIEF DESCRIPTION OF DRAWINGS

FIG. 7 is screen printed over FIG. 6.

FIG. 9 shows a message that will be hidden, that is screen printed with black standard non-disappearing fabric ink on white fabric (not shown).

FIG. 10 shows a masking area that is screen-printed on white fabric (not shown) using thermochromic disappearing ink in a non activated/cold state comprised of Type #27 thermochromic microcapsules from Matsui International Co., Inc., that begin to transition to transparent starting at 33 degrees Celsius (91.4 degrees Fahrenheit), on white fabric (not shown).

FIG. 11 shows a masking area that is screen-printed on white fabric (not shown) using thermochromic disappearing ink in a non activated/cold state comprised of Type #35 thermochromic microcapsules from Matsui International Co., Inc., that begin to transition to transparent starting at 36 degrees Celsius (96.8 degrees Fahrenheit).

DETAILED DESCRIPTION

Preferred Embodiment

Figure 1:
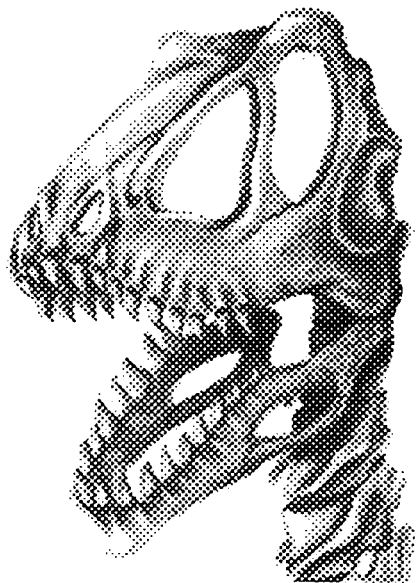
FIG. 1 shows a complicated halftone image of a dinosaur skeleton that will be a hidden image, which is screen printed onto a light colored fabric (not shown) with black, standard, non-disappearing fabric ink.
Figure 2:
FIG. 2 shows a masking image screen printed onto a light colored fabric (not shown) using black thermochromic disappearing ink in its non activated colorized state, which is used to help conceal the hidden image FIG. 1.

A preferred embodiment of the novelty fabric decorating process comprising of thermochromic (heat-activated) disappearing fabric ink, that is screen printed onto fabric in predetermined patterns, whereby allowing fabric decorations to perform dramatic transformations or allowing a hidden graphic or a hidden message printed with standard (non disappearing) fabric inks to remain concealed, until such time that the thermochromic disappearing ink begins the transition to transparent, revealing the hidden graphic or the hidden message is illustrated in FIGS. 1, 2, 3, 4, 5, 6, 7 and 8. Dramatic appearance changing designs can be created for clothing that provide and ever-changing interactive experience for the person wearing the garment.

Thermochromic ink is defined as ink that has the ability to change color or to become invisible when a pre-selected temperature is reached. Thermochromic disappearing inks have the ability to reverse back to a colorized state when exposed to a temperature colder than the designed threshhold/trigger point. Thermochromic disappearing fabric inks are composed primarily of two basic parts: a clear transparent ink suited for the intended fabric application and thermochromic microcapsules as a coloring agent. The thermochromic ink formulations that I am currently using consist of thermochromic microcapsules designed for use in water based ink applications, purchased from Matsui International Co., Inc., of Japan combined with clear "plastisol inks" purchased from Rutland Ink Co. or a clear water based ink purchased from Union Ink Company. Plastisol inks are simple compounds made up of PVC (polyvinyl chloride) resin, plasticizers and pigments. Plastisol inks do not air dry and only through the introduction of heat do they become solid and wash fast. My preferred clear base plastisol ink is "All Purpose Clear Shape" from Rutland Ink Company. Other clear inks offered by Rutland have shown to exhibit beneficial characteristics depending on the application, however for most applications the "All Purpose Clear Shape" works best. I have found thermochromic microcapsules, Type #27 and Type #35 from Matsui to work best for clothing applications. Thermochromic microcapsules can be manufactured to become transparent at a wide variety of temperatures; these color changing or color disappearing temperature points are called the "threshold point" or the "trigger point". For clothing fabric, a temperature threshold point from 27 degrees Celsius (80.6 degrees Fahrenheit) to 41 degrees Celsius (105.8 degrees Fahrenheit) works best, however a thermochromic ink with a much higher threshold point could be used on clothing fabric which would require the garment to be exposed to an external heat source such as a hair dryer, heat from a stovetop/cooking range or even a cloths laundry dryer. This feature could be tailored to provide numerous amusing novelty decorations such as an apron with an intricate floral design comprised of thermochromic disappearing ink with a high thresh-hold point, containing a hidden text message "World's Worst Cook" printed with standard inks within the design. "World's Worst Cook" would only become visible when the apron is exposed to greater than normal temperatures such as that generated by a range top or oven. Another example of using a thermochromic disappearing ink with a higher than normal thresh-hold/trigger point could be a T-shirt with a design where the hidden words "I love you", would remain hidden until the item was taken out of a hot cloths dryer.

Additionally, by using multiple thermochromic inks with different temperature range thresh-hold/trigger points within a single graphic design, a transformation transition can be prolonged or the fabric decoration could contain multiple hidden messages that would become revealed one at a time in succession, as each of the predetermined temperature threshold points are reached. A good example of this would be a "work out shirt" with the following messages revealed in succession: "Must Work Harder", "Feel the Burn", "Great Work Out!". A person wearing the "work out shirt" would experience encouraging messages in succession as an increase in their body heat would cause each threshold point to be reached revealing the numerous hidden text messages.

The major technical obstacle that needed to be overcome was the thermochromic inks' lack of opacity. Thermochromic inks by nature are transparent and therefore lack the ability to conceal an image or message by simply screen printing over an image or a massage with a solid image area such as a solid filled circle screen printed with a dark colored thermochromic ink. Commercially available disappearing inks do not yield acceptable results, so custom formulations were needed. By using a thermochromic micro capsule intended for water based inks and combining it with All Purpose Clear Shape plastisol ink, at a ratio of one part thermochromic micro capsules to four parts clear plastisol, I was able to create a formulation that resulted in disappearing inks with a significantly darker "color value" than commercially available thermochromic disappearing inks, that were easy to screen print and laundered very well. "Color value" is defined as the relative lightness or darkness of a color.

Figure 3:
FIG. 3 shows the result of screen printing FIG. 1 with black regular fabric ink and black thermochromic disappearing ink in its non activated colorized state FIG. 2, together in registration (in exact alignment) on a light colored fabric.
Figure 4:
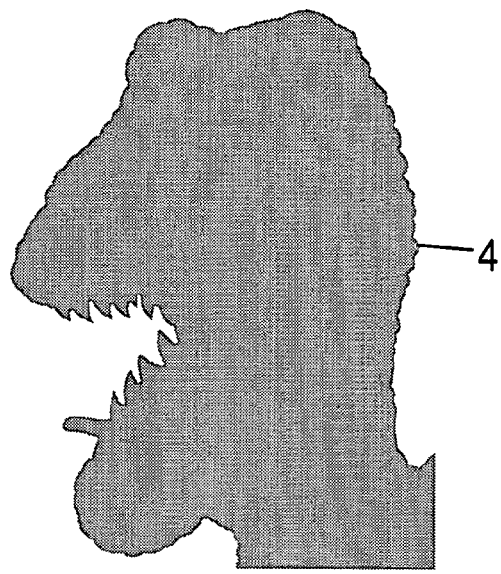
FIG. 4 shows the result of FIG. 1 screen printed onto a light colored fabric (not shown) with a light brown regular fabric ink and the masking image shown in FIG. 2 screen printed in registration on the same piece of light colored fabric with a similar colored light brown thermochromic disappearing ink in its non activated/colorized state.
Figure 5:
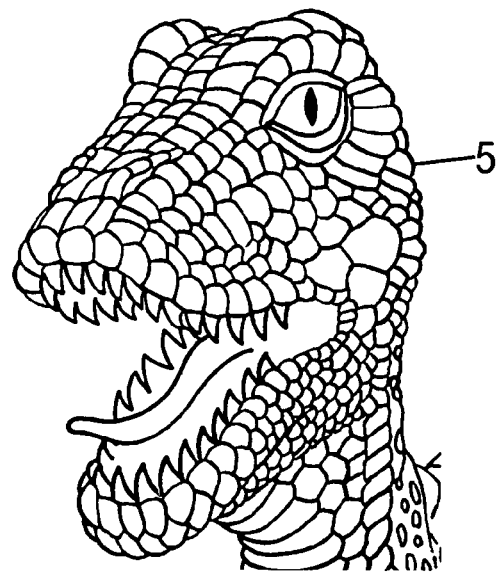
FIG. 5 shows a line art image printed on light colored fabric (not shown) with black thermochromic disappearing ink in its non activated colorized state, which is used to help conceal the hidden picture FIG. 1.
Figure 6:
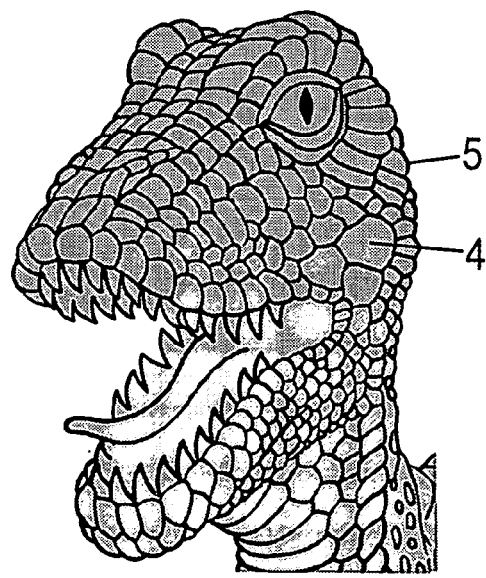
FIG. 6 shows black thermochromic disappearing ink line art in its non activated colorized state, screen printed over FIG. 4 on light colored fabric (not shown).
Figure 7:
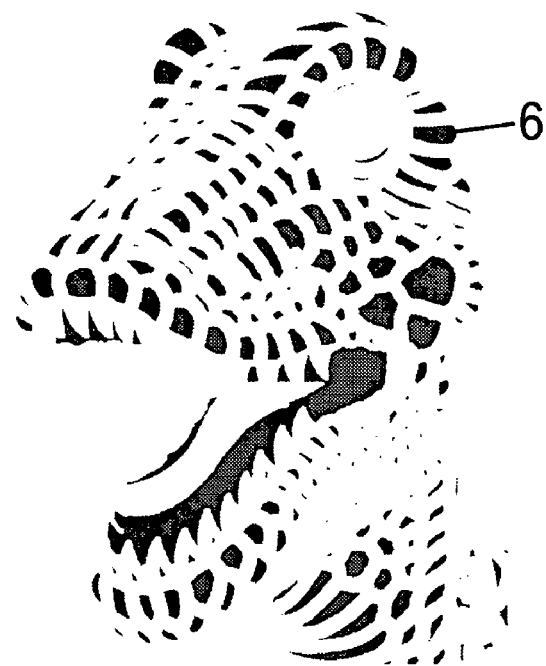
FIG. 7 shows a pattern designed to resemble raised scales, screen printed onto a light colored fabric (not shown) with a dark green thermochromic disappearing ink in its non-activated colorized state.
Figure 8:
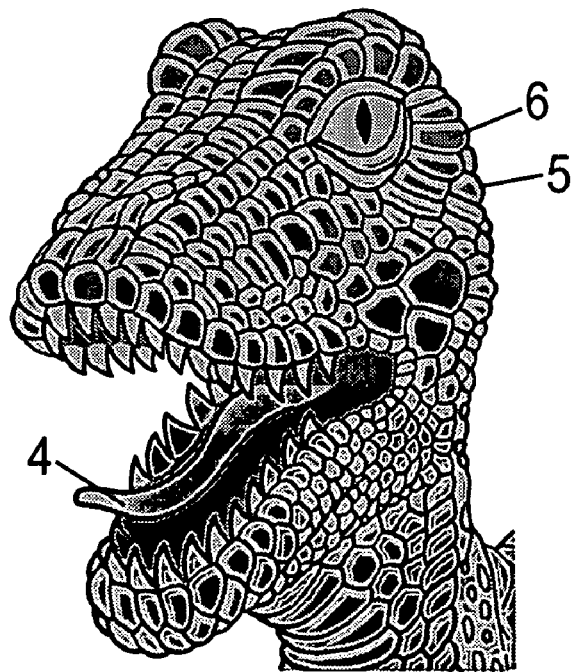
FIG. 8 shows the combined result when the dark green thermochromic disappearing ink raised scales pattern

What allows my invention to conceal a complicated halftone image is a process whereby you first screen print through a 110-140 threads per centimeter (tpc) (280-355 threads per inch) dyed monofilament polyester screen mesh the desired hidden image with standard fabric ink (FIG. 1) onto a light colored fabric. Next, an image composed of thermochromic disappearing ink (FIG. 2) which has a similar color value or similar hue to the color used for the hidden image is printed through a 91-110 tpc (230-280 threads per inch) dyed monofilament polyester screen mesh around, not covering, not over and not on top of, the previously printed hidden image, resulting in (FIG. 3). An exact color match is not needed. What is most important is that the colors of the standard ink and the thermochromic disappearing ink are of a similar color value and for best results near one another on the color wheel, such as a medium green and a medium blue or a dark red and a dark orange. If (FIG. 1) was printed onto light colored fabric with a medium color value, brown standard ink and (FIG. 2) was printed in registration to (FIG. 1) onto the same piece of fabric with a medium color value, brown thermochromic disappearing ink the result would be a light colored silhouette shown in (FIG. 4). Lastly, creative detailed line-work 5 (FIG. 5) is printed through a 54 tpc (137 threads per inch) monofilament polyester screen mesh with a dark colored disappearing thermochromic ink over 4 (FIG. 4) resulting in (FIG. 6). This allows a hidden image such as the complicated halftone (small dots of different sizes used in the printing industry to create tonal range) skeleton (FIG. 1) to be completely concealed. Virtually any hidden graphic, including complex halftone images, can be incorporated into a decoration on fabric. By using the combination of masking techniques described, a hidden image can remained concealed longer on an article of clothing with a more dramatic transformation than if either means of concealment were used independently. To enhance a designs ability to conceal an image further, some designs allow for additional patterns to be incorporated using thermochromic disappearing ink. An example of this is demonstrated by the raised scales pattern in 6 (FIG. 7) which when screen printed through a 54-61 tpc (137-156 threads per inch) monofilament polyester screen mesh over (FIG. 6) with a dark green thermochromic disappearing ink, would result in the image created in (FIG. 8)

FIGS. 9-14—Additional Embodiments

Figure 12:
FIG. 12 shows (FIG. 9), (FIG. 10) and (FIG. 11) screen printed together in registration on a white fabric (not shown) at a temperature of less than 33 degrees Celsius (less than 91.4 degrees Fahrenheit).
Figure 13:
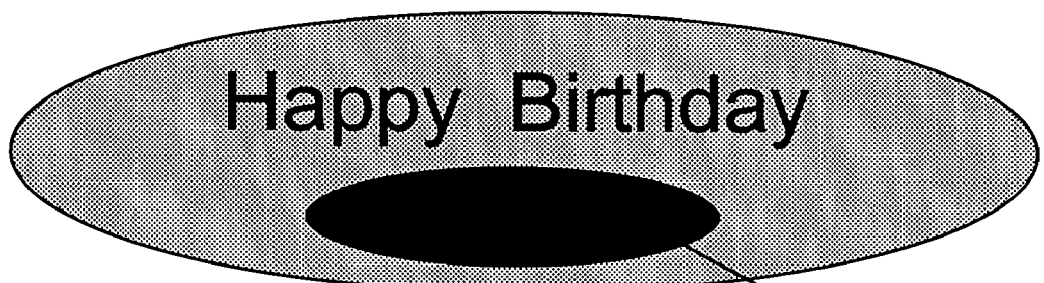
FIG. 13 is the visual appearance of the entire graphic comprised of (FIG. 9), (FIG. 10), and (FIG. 11) at temperature of 36 degrees Celsius (96.8 degrees Fahrenheit) screen printed on a white fabric (not shown).
Figure 14:
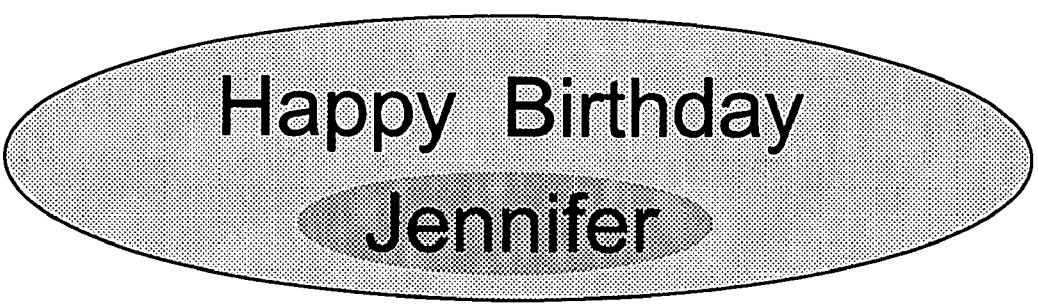
FIG. 14 is the visual appearance of the graphic comprised of (FIG. 9), (FIG. 10), and (FIG. 11) at temperature of 39 degrees Celsius (102.2 degrees Fahrenheit) screen printed on a white fabric (not shown).

Additional embodiments are shown in FIGS. 9,10,11,12, 13 and 14; which demonstrate with a very simplistic design the way to produce a decoration that contains two hidden text message that become revealed in succession. FIGS. 9, 10 and 11 show the three images that are to be individually screen printed onto a white fabric (not shown) in registration to one another. FIG. 9 shows the complete message that will be hidden, which is screen printed with black standard non-disappearing fabric ink through a 54-61 tpc (137-156 threads per inch) monofilament polyester screen mesh onto a white fabric substrate (not shown). FIG. 10 shows a masking area that is screen-printed through a 54-61 tpc (137-156 threads per inch) monofilament polyester screen mesh onto white fabric substrate (not shown) using a thermochromic disappearing ink comprised of Type #27 thermochromic microcapsules from Matsui International Co., Inc. Type #27 thermochromic micro capsules will begin to transition to transparent at 33 degrees Celsius (91.4 degrees Fahrenheit), and will become completely transparent at approximately 36.5 degrees Celsius (99.8 degrees Fahrenheit). FIG. 11 shows a masking area that is screen-printed through a 54-61 tpc (137-156 threads per inch) monofilament polyester screen mesh onto white fabric (not shown) using thermochromic disappearing ink comprised of Type # 35 thermochromic microcapsules from Matsui International Co., Inc. Type #35 microcapsules will begin to transition to transparent starting at 36 degrees Celsius (96.8 degrees Fahrenheit) and will become completely invisible at approximately 39.5 degrees Celsius. FIG. 12 shows FIGS. 9, 10 and 11 screen printed together in registration on a white fabric (not shown) at a temperature of less than 33 degrees Celsius. The image appears to be one continuous black oval. FIG. 13 shows the visual appearance of the graphic FIG. 12 comprised of FIGS. 9, 10 and 11 at temperature of approximately 36 degrees Celsius (96.8 degrees Fahrenheit) screen printed on a white fabric (not shown). The small black oval 10 continues to conceal the word "Jennifer" because its threshold/trigger point temperature has not yet been reached. FIG. 14 shows the visual appearance of the graphic comprised of FIGS. 9, 10 and 11 at temperature of approximately 39 degrees Celsius (102.2 degrees Fahrenheit) screen printed on a white fabric (not shown). Both hidden text messages are visible despite the fact that the thermochromic inks are not yet completely invisible.

FIGS. 15-20—Alternative Embodiments

Figure 15:
FIG. 15 is a detailed line art illustration of a Saber-tooth Tiger screen printed with a black thermochromic disappearing ink comprising thermochromic micro crystals Type # 27 in a non-activated/cold state, printed on a white fabric (not shown) at a temperature below 33 degrees Celsius (91.4 degrees Fahrenheit)
Figure 16:
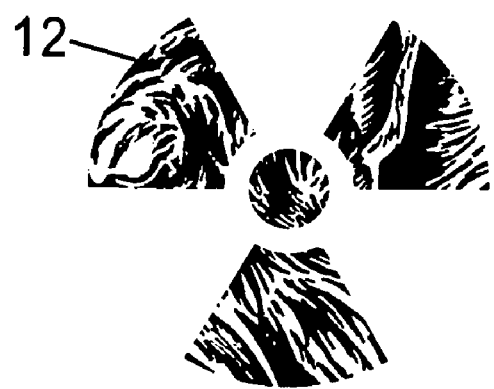
FIG. 16 is a distressed (broken and fragmented) radiation symbol which is an image to be hidden/concealed, screen printed with a dark colored standard fabric ink on a white fabric (not shown). This small distressed image is best viewed at a distance of 3 meters (approximately ten feet), however larger distressed images may be better viewed at greater distances.
Figure 17:
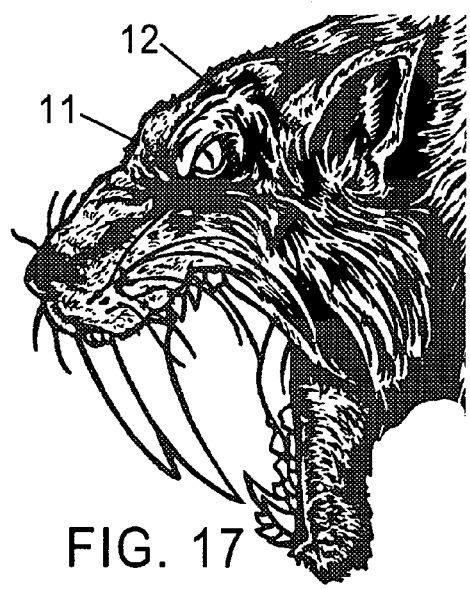
FIG. 17 is the visual appearance of the entire graphic comprised of (FIG. 15) and (FIG. 16) screen printed in registration on a white fabric (not shown) at temperature of approximately 34 degrees Celsius (93.2 degrees Fahrenheit). The Saber-tooth Tiger is the dominant image when viewed at a distance of 3 meters (approximately ten feet), or more.
Figure 18:
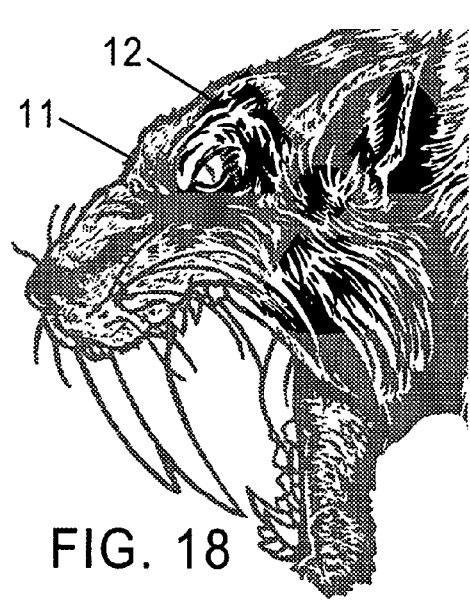
FIG. 18 is the visual appearance of the same graphic shown in (FIG. 17) comprised of (FIG. 15) and (FIG. 16) screen printed on a white fabric (not shown) at temperature of approximately 35 degrees Celsius (95 degrees Fahrenheit).
Figure 19:
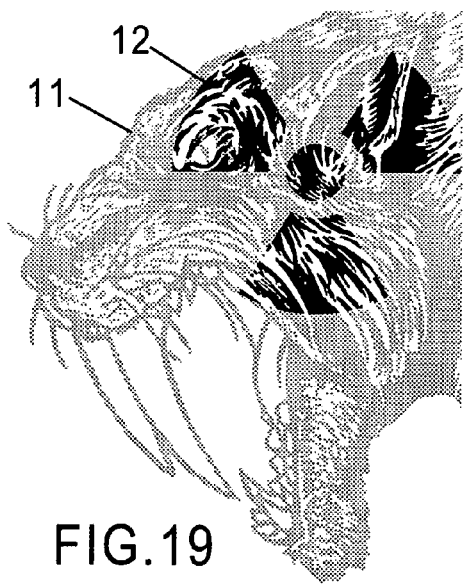
FIG. 19 is the visual appearance of the same graphic shown in (FIG. 17) comprised of (FIG. 15) and (FIG. 16) screen printed on a white fabric (not shown) at temperature of approximately 37 degrees Celsius (98.6 degrees Fahrenheit).

I have developed a multitude of possibilities with regard to how to conceal an image on fabric using thermochromic ink and with regard to the final visual appearance characteristics of the hidden image. In the Alternative Embodiments shown in FIGS. 15, 16,17,18,19 and 20 an image of a Saber-tooth Tiger (FIG. 15) will conceal a radiation symbol (FIG. 16). The concealment process used in this example, results in the radiation symbol (FIG. 16) appearing distressed (broken and fragmented), which is a characteristic of this concealment technique. The following process allows almost any simple silhouette icon or simple text message to be hidden under a detailed line art image with only two screen printed colors. FIG. 15 shows a detailed line art illustration of a Saber-tooth Tiger that will be screen printed through a 54 tpc (137 lines per inch) monofilament screen mesh with a black thermochromic disappearing ink comprising thermochromic micro crystals Type # 27 in a non-activated/cold state, printed on white fabric (not shown) at a temperature below 33 degrees Celsius (91.4 degrees Fahrenheit) used to conceal a hidden image 12 (FIG. 16). FIG. 16 shows a distressed (broken and fragmented) radiation symbol which is an image that will be hidden/concealed, screen printed through a 54 tpc (137 thread per inch) monofilament screen mesh with a dark colored standard fabric ink on a white fabric (not shown). This small distressed image is best viewed at a distance of approximately 3 meters or more (ten feet or more); however larger distressed images or images where the line art print is less detailed may be better viewed at greater distances. FIGS. 17, 18, 19 and 20 show a transformation process at different stages. FIG. 17 shows the visual appearance of the graphic comprised of (FIGS. 15 and 16) screen printed on a white fabric (not shown) at temperature of approximately 34 degrees Celsius (93.2 degrees Fahrenheit). At a distance of 3 meters (approximately 10 feet) the Saber-tooth Tiger image 11 is still the dominant image while the radioactive symbol 12 can not be seen. FIG. 18 shows the visual appearance of the entire graphic comprised of FIGS. 15 and 16 screen printed on a white fabric (not shown) at temperature of approximately 35 degrees Celsius (95 degrees Fahrenheit). FIG. 19 shows the visual appearance of the graphic comprised of FIGS. 15 and 16 screen printed on a white fabric (not shown) at temperature of approximately 37 degrees Celsius (98.6 degrees Fahrenheit).

Figure 20:
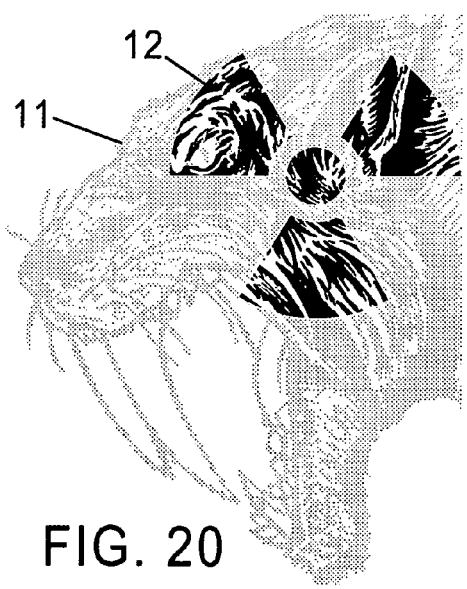
FIG. 20 is the visual appearance of the same graphic shown in (FIG. 17) comprised of (FIG. 15) and (FIG. 16) screen printed on a white fabric (not shown) at temperature of approximately 39 degrees Celsius (102.2 degrees Fahrenheit). The Saber-tooth Tiger image 11 is still visible, but at a distance of 3 meters (approximately ten feet), or more the radiation symbol 10 is the only perceptible image.

FIG. 20 shows the visual appearance of the graphic comprised of (FIGS. 15 and 16) screen printed on a white fabric (not shown) at temperature of approximately 39 degrees Celsius (102.2 degrees Fahrenheit). The Saber-tooth Tiger image 11 is still visible at a short distance, but at a distance of 3 meters (approximately 10 feet) the radiation symbol 12 is the only distinguishable image.

CONCLUSION, RAMIFICATIONS, AND SCOPE OF INVENTION

Thus the reader will see that the fabric decorating process provides a multitude of novelty and practical uses when used to embellish fabric with screen printed images, which would appeal to people of all ages, sex and cultural back-rounds.

While my above description contains many specificities, these would not be construed as limitations on the scope of the invention, but rather as an exemplification of one preferred embodiment thereof. Many other variations are possible. For example
1. The process could be used on a dark colored fabric if the fabric is first printed with a water-based "discharge ink". Discharge ink, is an ink that bleaches a dark fabric to a very light off-white color. By combining the Appearance Changing Decorations on Fabric Using Disappearing Ink Process, with discharge ink printing, dramatic results could be achieved on dark colored fabric.
2. Simplistic distressed (broken and fragmented) images, printed with standard fabric inks, can be concealed directly under the line work of intricate one-color illustrations screen printed with a single dark-colored thermochromic ink. The hidden distressed image is only printed directly under areas containing the dark colored thermochromic ink line work, giving the concealed image a broken/fragmented look. Because of the broken/fragmented nature of the hidden distressed design, it is best viewed at a distance.
3. Thermochromic ink could be formulated to perfectly match the color of a dark colored shirt. The shirt would be screen printed over the previously printed discharge ink with a design using discharge ink to bleach-out/remove the color from the fabric to a light off-white fabric color. Next, the exact same image as that printed with discharge ink would be screen printed in registration with the thermochromic disappearing ink previously formulated that matches the shirt color. The result would be a garment that would appear to be a plain, unprinted dark colored shirt, however, once the shirt was exposed to the predetermined temperature thresh hold/ trigger point, a design would magically appear.

4. Thermochromic disappearing inks could be injection molded onto fabric providing a color changing or color vanishing three dimensional raised decoration, capable of concealing a hidden image or transforming its appearance. If a silver metallic pigment were added to the thermochromic ink formulation, a color transforming, three dimensional, silver metallic rhinestone decoration could be created on fabric.

5. Images can be created that are screen printed on fabric that appear to be a simplistic black and white tonal image that dramatically transforms becoming colorized and/or color photo realistic. The black and white image used to conceal the color image would be a one color screen printed image comprised of large black halftone dots using thermochromic disappearing ink. The colorization would be produced by first screen printing a fabric with a color image comprising standard CMYK (Cyan, Magenta, Yellow and black) fabric inks. The colorized four color process version of the image on the fabric would be printed directly under the location of the intended large black thermochromic ink halftone dots. The black thermochromic disappearing ink halftone image would be screen printed over the color image. It should be noted that because there would only be a single thermochromic halftone image to conceal the color image, the colorized image may need to be intentionally fragmented, resulting in a color image that is best viewed at a distance.

6. Duo-Tone (having only two tonal range of different colors) images could transform into full color images as described in previous ramification #5. These images would have better thermochromic ink concealment ability because there would be two thermochromic concealment colors and could be viewed at a closer distance than ramification #5.

7. Decorations on fabric could transform from full color images to simple black and white images. This would be accomplished by first formulating three thermochromic disappearing fabric inks in the colors Cyan, Magenta and Yellow (CMY) that are used to produce four color process (full color) images. The thermochromic CMY inks would be screen printed onto fabric and the black halftone image would be over-printed last with a black standard fabric ink.

8. Decorations can be screen printed on fabric incorporating thermochromic inks that appear "out-of-focus" or "blurry" in appearance until the thermochromic inks used within the printed decoration perform a transition to transparent. As the thermochromic inks begin to fade the decoration would come into sharp focus. In this example the hidden image would be an "in-focus" image and the thermochromic disappearing would be designed to make the decoration appear "out-of-focus" when in a non activated/cold state.

Accordingly, the scope of the invention should be determined not by the embodiment(s) illustrated, but by the appended claims and their legal equivalents.

I claim:

1. A process to provide a means to decorate dark colored cotton fabric with thermochromic disappearing ink wherein a desired image is first screen printed with a water-based discharge ink onto a dark colored cotton fabric to remove or bleach the color from said dark colored cotton fabric, and in exact registration an exact likeness of said desired image is screen printed onto said dark colored cotton fabric with a water based, thermochromic disappearing ink that has been previously matched to a near color of said dark colored cotton fabric allowing said desired image to appear almost completely hidden until such time that said thermochromic disappearing ink transitions toward transparent.

2. A process to create a decoration on fabric comprising at least three thermochromic disappearing inks that are printed onto said fabric in predetermined halftone dot patterns, wherein said thermochromic disappearing inks appear cyan, magenta and yellow in color, and are screen printed in a standard four color process halftone dot pattern to provide color to a photo-realistic, image or picture, and a black non-disappearing fabric ink is printed as a halftone image into certain areas of same said decoration providing a means for said decoration to transform in appearance from a full color image to a colorless black and white photographic halftone image when said thermochromic disappearing inks transition to colorless.

* * * * *